United States Patent
Prusa et al.

(10) Patent No.: US 11,434,071 B1
(45) Date of Patent: Sep. 6, 2022

(54) HOPPER COVER AND HOPPER COVER SYSTEM

(71) Applicant: Turfware Equipment Company, Stow, OH (US)

(72) Inventors: John C. Prusa, Stow, OH (US); Sylvester G. Smith, Ravenna, OH (US)

(73) Assignee: Turfware Equipment Company, Stow, OH (US)

( * ) Notice: Subject to any disclaimer, the term of this patent is extended or adjusted under 35 U.S.C. 154(b) by 0 days.

(21) Appl. No.: 17/494,324

(22) Filed: Oct. 5, 2021

(51) Int. Cl.
| | |
|---|---|
| *A01C 15/12* | (2006.01) |
| *B65D 43/12* | (2006.01) |
| *A01C 15/00* | (2006.01) |
| *B65D 90/54* | (2006.01) |
| *B65D 88/26* | (2006.01) |
| *E01C 19/20* | (2006.01) |

(52) U.S. Cl.
CPC ............ *B65D 90/54* (2013.01); *B65D 88/26* (2013.01); *A01C 15/006* (2013.01); *E01C 2019/2055* (2013.01)

(58) Field of Classification Search
CPC ....... A01C 15/006; A01C 17/001; A01C 7/20; B65D 43/12; B65D 43/20; B65D 90/54; B65D 2583/0454; E01C 2019/2055
USPC ............ 111/200, 63, 186; 220/212.5, 345.1, 220/345.2, 345.3, 812; 239/650, 663, 239/661, 681, 683, 668; 49/414; 222/424.5
See application file for complete search history.

(56) References Cited

U.S. PATENT DOCUMENTS

| | | | | | |
|---|---|---|---|---|---|
| 2,064,241 | A | * | 12/1936 | Batdorf | B65D 83/0481 220/351 |
| 2,083,356 | A | * | 6/1937 | Batdorf | B65D 43/12 220/351 |
| 2,102,094 | A | * | 12/1937 | Romig | B65D 43/12 220/351 |
| 2,463,586 | A | * | 3/1949 | Anderson | B65D 43/12 220/351 |
| 2,738,904 | A | * | 3/1956 | Poynor | A01C 15/006 222/386 |
| 3,782,584 | A | * | 1/1974 | Swenson | B65D 43/12 220/345.3 |
| 4,502,610 | A | | 3/1985 | Todd | |
| 5,072,676 | A | * | 12/1991 | Pingry | A01C 15/006 111/63 |
| 5,458,256 | A | * | 10/1995 | Opheim | A01C 15/006 220/345.3 |

(Continued)

*Primary Examiner* — Gideon R Weinerth
(74) *Attorney, Agent, or Firm* — Renner, Otto, Boisselle & Sklar, LLP (57) ABSTRACT

A hopper lid for a hopper having a top opening may include a top panel, side channels formed on sides of the hopper lid and configured to engage side ridges of the hopper for the hopper lid to slide over the top opening, a front stop formed on a front of the hopper lid and configured to engage a front ridge of the hopper to stop the hopper lid from further sliding rearward when the top panel fully covers the top opening, and an undulation formed on the hopper lid protruding vertically lower than the top panel and adjacent the front stop to, together with the front stop form a detent that, when the top panel fully covers the top opening, traps the front ridge of the hopper between the front stop and the undulation to resist slide of the hopper lid, effectively locking the hopper lid to the hopper.

20 Claims, 5 Drawing Sheets

(56) References Cited

U.S. PATENT DOCUMENTS

| | | | | |
|---|---|---|---|---|
| 6,092,476 | A * | 7/2000 | Wilson | A01C 15/006 |
| | | | | 111/200 |
| 6,240,862 | B1 | 6/2001 | Dunham | |
| 6,637,678 | B2 | 10/2003 | Wyne | |
| 6,978,952 | B2 | 12/2005 | Kost | |
| 9,420,739 | B2 * | 8/2016 | Rollenhagen | A01C 7/20 |
| 10,682,006 | B2 | 6/2020 | Hundley | |
| 2002/0139802 | A1 * | 10/2002 | Cross | B65D 43/20 |
| | | | | 220/345.2 |
| 2004/0108318 | A1 * | 6/2004 | Wang | B65D 43/12 |
| | | | | 220/345.2 |
| 2005/0092763 | A1 * | 5/2005 | Haggerty | B65D 83/0864 |
| | | | | 220/812 |
| 2008/0110892 | A1 * | 5/2008 | House | A01C 15/006 |
| | | | | 220/324 |
| 2008/0179432 | A1 * | 7/2008 | Hodge | A01C 15/006 |
| | | | | 49/404 |
| 2010/0072206 | A1 * | 3/2010 | Doyle | B65D 43/12 |
| | | | | 220/345.2 |
| 2014/0224843 | A1 * | 8/2014 | Rollenhagen | A01C 15/006 |
| | | | | 222/608 |

* cited by examiner

HOPPER COVER AND HOPPER COVER SYSTEM

FIELD OF THE INVENTION

The present disclosure relates to spreader covers or lids. Specifically, the present invention provides spreader covers that are configured for enclosing the hopper of a spreader device (e.g., to protect from rain and/or spillage). In certain embodiments, the hopper cover may be slid back, along the hopper opening ridge, to install the hopper cover to the hopper. In certain embodiments, the hopper cover includes a self-locking mechanism to secure the hopper cover to the hopper.

BACKGROUND

Spreader devices are used to distribute all types of spreadable materials over a selected ground area. Such material spreader devices may be used to distribute fertilizers, pesticides, seeds, salt, or other materials in particulate or finely divided form over the selected ground area. Generally, material spreaders can be classified in two general categories: broadcast spreaders and drop spreaders. All types of spreaders, however, suffer from the problem of enclosing the top of the hopper of the spreader device to protect against rain and spillage. Covers known in the art are elastic based covers that are subject to numerous problems, such as ripping, pooling of water, and the difficulty of securely installing and removing the hopper cover to the hopper. As such, there is a need in the art for hopper covers that address these limitations.

SUMMARY OF THE INVENTION

The present disclosure provides a hopper and hopper cover system. The system includes a hopper cover that is substantially rigid and is configured to slide on the hopper. The exemplary hopper cover includes an undulation that may serve as both a handle and as a locking mechanism securing the hopper cover into place while fully covering the top opening of the hopper.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
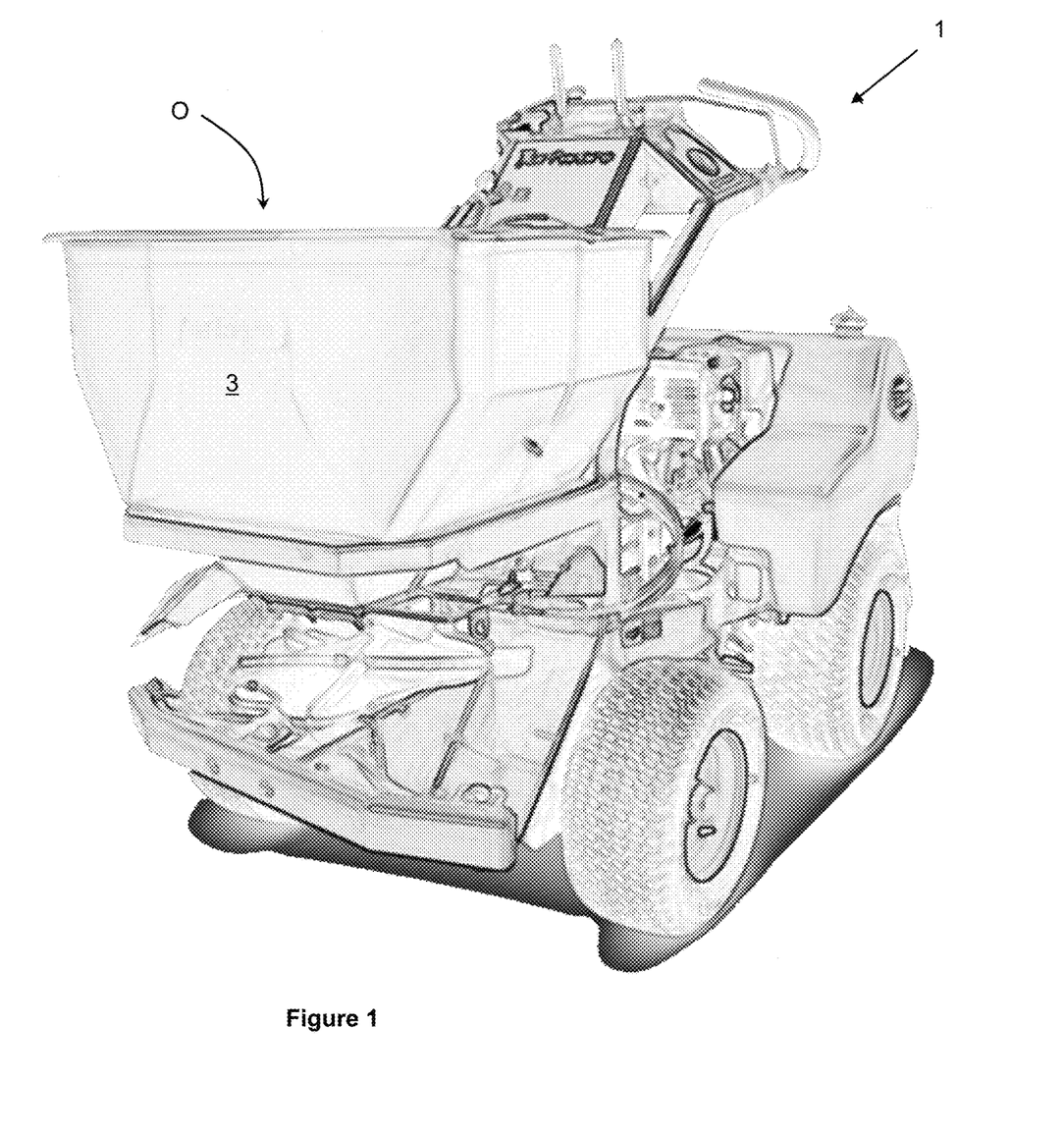
FIG. 1 illustrates a perspective view of an exemplary ride-on spreader.

FIG. 1 illustrates an exemplary ride-on spreader 1 of the type used to distribute spreadable materials such as fertilizers, pesticides, seeds, salt, or other materials in particulate or finely divided form over an area. The spreader 1 includes a hopper 3 in which the material to be spread is deposited for spreading. The hopper 3 has an opening O at the top through which the material to be spread is deposited into the hopper 3. The hopper 3 may be filled with the material to be spread and the spreader 1 may travel over the area to be treated while at the same time spreading the material. While FIG. 1 illustrates a ride-on spreader, the invention disclosed herein is applicable to any spreader that includes a hopper.

FIGS. 2A-2G illustrate various views of the exemplary hopper 3 and a hopper cover 10. Together, the hopper 3 and the hopper cover 10 form a hopper cover system. The hopper cover 10 may be installed on the hopper 3 to cover the opening O and, therefore, may serve to protect the material in the hopper 3 from rain, spillage, etc. The hopper cover 10 includes a top panel 11 that covers the top opening O. The hopper cover 10 including the top panel 11 may be substantially rigid to prevent the product in the hopper 3 from spilling. The hopper cover 10 including the top panel 11 may be transparent or translucent so that a user may be able to see into the hopper 3 and inspect its contents even when the hopper cover 10 is installed.

Figure 2A:
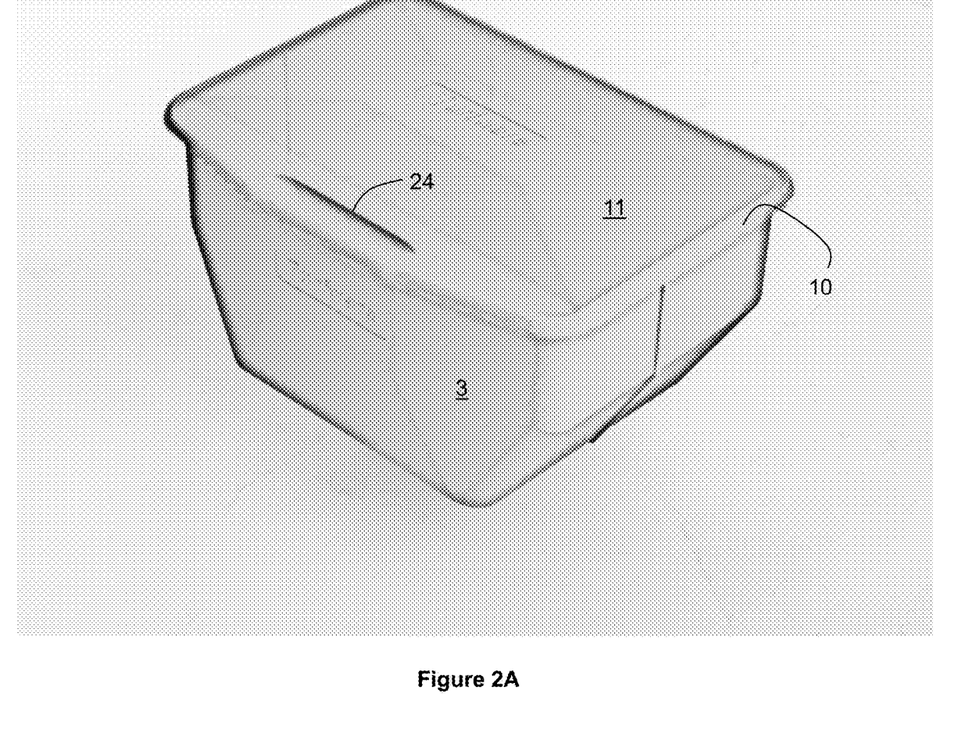
FIG. 2A illustrates a perspective view of an exemplary hopper system.
Figure 2B:
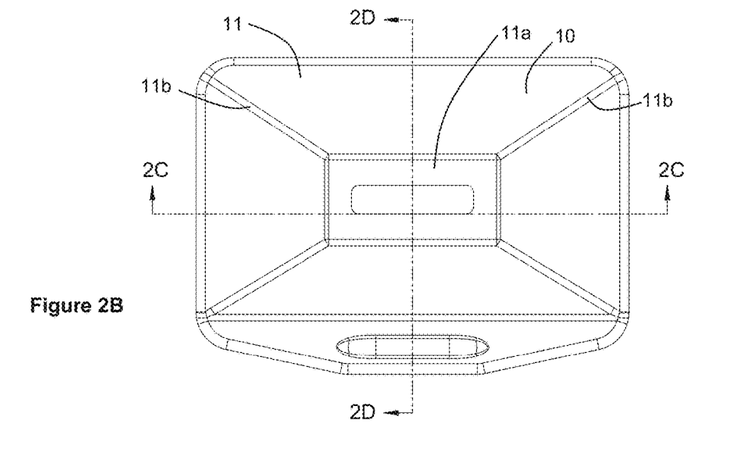
FIG. 2B illustrates a top view of the exemplary hopper system of FIG. 2A.

FIG. 2B illustrates a top view of the hopper cover system.

Figure 2C:
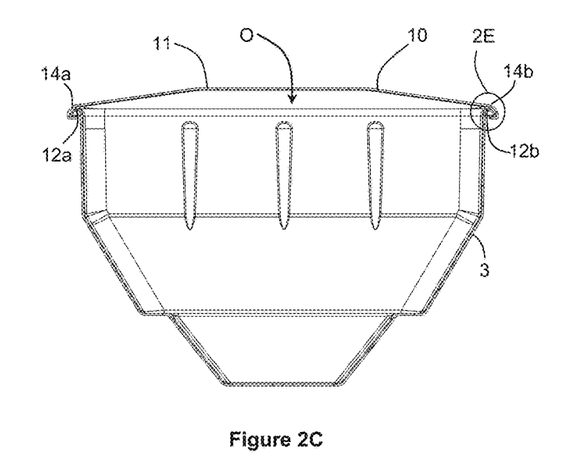
FIG. 2C illustrates a front to back cross-sectional view of the exemplary hopper system of FIG. 2A.
Figure 2D:
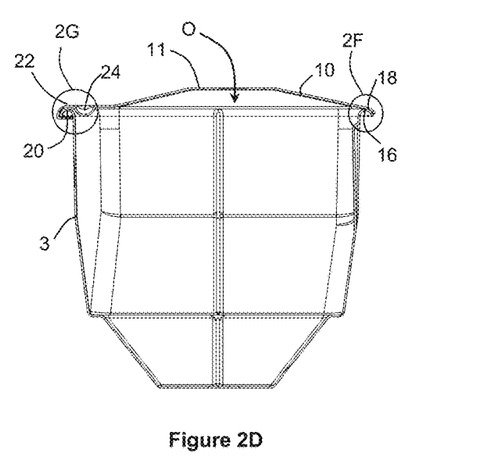
FIG. 2D illustrates a side to side cross-sectional view of the exemplary hopper system of FIG. 2A.
Figure 2E:
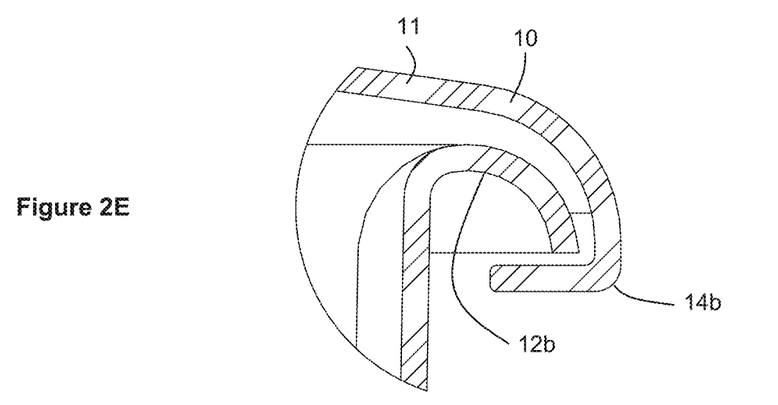
FIG. 2E illustrates a magnified view of a cross-sectional side portion of the exemplary hopper system of FIG. 2A.

FIG. 2C illustrates a cross-sectional view for illustrating sides cross sections of the hopper cover system, and FIG. 2E illustrate a magnified view of a portion of the cross sections. As best seen in FIGS. 2C and 2E, the hopper 3 has formed thereon side ridges 12a, 12b. The hopper cover 10, for its part, has side rails 14a, 14b that are attached to, or integral with, the top panel 11 and, together with the top panel 11, form side channels that engage the side ridges 12a, 12b of the hopper 3. In use, the side rails 14a, 14b of the hopper cover 10 engage the side ridges 12a, 12b of the hopper 3 and, thus, the hopper cover 10 may slide forward and rearward on the hopper 3 with the top panel 11 over the top opening O.

Figure 2F:
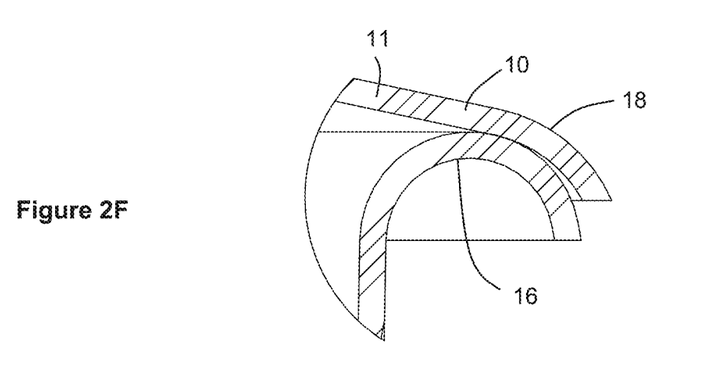
FIG. 2F illustrates a magnified view of a cross-sectional rear portion of the exemplary hopper system of FIG. 2A.
Figure 2G:
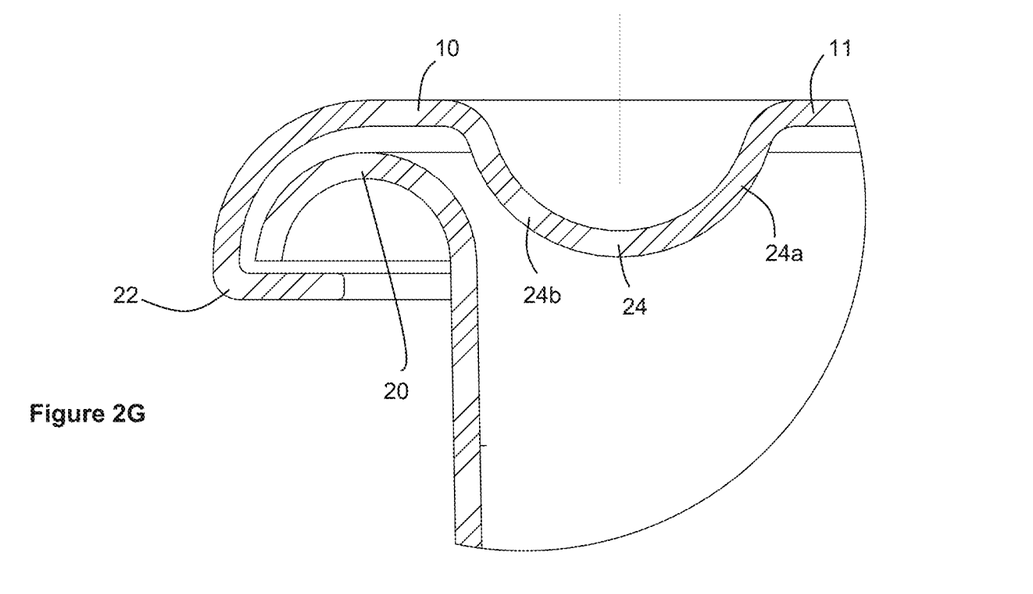
FIG. 2G illustrates a magnified view of a cross-sectional front portion of the exemplary hopper system of FIG. 2A.

FIG. 2D illustrates a cross-sectional view for illustrating front and rear cross sections, and FIGS. 2F and 2G illustrate magnified views of portions of the front and rear cross sections, respectively, of the hopper cover system.

As best seen in FIGS. 2D and 2F, the hopper 3 has formed thereon a rear ridge 16. The hopper cover 10, for its part, has a rear lip 18 attached to, or integral with, the top panel 11. The rear lip 18 may have a downward slope to, when the hopper cover 10 is fully engaged to the hopper 3, at least partially cover the rear ridge 16 of the hopper 3.

As best seen in FIGS. 2D and 2G, the hopper 3 has formed thereon a front ridge 20. The hopper cover 10, for its part, has a front stop 22 attached to, or integral with, the top panel 11. The front stop 22 engages the front ridge 20 to stop the hopper cover 10 from further sliding rearward, when the top panel 10 fully covers the top opening O. The hopper cover 10 further includes or has formed thereon an undulation 24 protruding vertically lower than the top panel 11. The undulation 24 is disposed on the hopper cover 10 adjacent the front stop 22 to, together with the front stop 22, form a detent that, when the hopper cover 10 is fully engaged to the hopper 3, traps the front ridge 20 between the front stop 22 and the undulation 24 to resist sliding of the hopper cover 10, effectively locking the hopper cover 10 to the hopper 3. The undulation 24 may have front and rear curved surfaces 24a, 24b that promote flexing of the hopper cover 10 when the rear curved surface 24a engages the front ridge 20 as the hopper cover 10 slides rearward to allow the detent to engage the front ridge 20 and when the front curved surface 24b engages the front ridge 20 as the hopper cover 10 is urged frontward for the detent to disengage the front ridge 20.

In use, a user would align the rear of the hopper cover 10 to the front of the hopper 3 and engage the side rails 14a, 14b of the hopper cover 10 to the side ridges 12a, 12b of the hopper 3. The front ridge 20 may interfere with the rear lip 18 and, thus, resist such engagement. However, the rear lip 18 may be vertically high enough and the material pliable or flexible enough that the user may overcome the resistance by pressing rearwards on the hopper cover 10 causing the front ridge 20 and/or the rear lip 18 to flex to allow the engagement. With the side rails 14a, 14b engaged to the side ridges 12a, 12b as shown in FIG. 2E, the user may slide the hopper cover 10 rearwards until the rear lip 18 meets the rear ridge 16 and/or until the undulation 24 meets the front ridge 20. At this point, interference between the rear lip 18 and the rear ridge 16 and/or the undulation 24 and the front ridge 20 may resist further rearwards sliding of the hopper cover 10. But, again, the rear lip 18 may be vertically high enough and the material pliable or flexible enough that the user may overcome the resistance by pressing rearwards on the hopper cover 10 causing the rear ridge 20 and/or the rear lip 18 to flex, eventually resulting in the engagement shown in FIG. 2F. Similarly, such rearward pressure by the user may overcome the resistance between the undulation 24 and the front ridge 20. The user may then finish sliding the hopper cover 10 until the front ridge 20 meets the front stop 22 stopping any further rearwards sliding, eventually resulting in the engagement shown in FIG. 2G. At this point, the hopper cover 10 fully covers the opening O of the hopper 3.

Importantly, as shown in FIG. 2G, at this point the front ridge 20 is effectively trapped between the front stop 22 and the undulation 24. In this sense, the undulation 24 and the front stop 22 form a detent that, with the hopper cover 10 fully covering the top opening O of the hopper 3, effectively locks the hopper cover 10 to the hopper 3. The side rails 14a, 14b, the front stop 22, and the rear lip 18 may all have generally downwardly sloping and overhanging configurations to effectively cover the opening O, keeping away water and debris and preventing spillage of the hopper's contents.

Another feature of the hopper cover 10 is that the undulation 24 may be shaped as a handle or grab point so the user can use her hand to grab the hopper cover 10 when sliding it rearwards or forwards on the hopper 3.

Removal of the hopper cover 10 from the hopper 3 involves the opposite action. The user would pull forward on the hopper cover 10 (e.g., by pulling on the handle or grab point formed by the undulation 24) strongly enough to overcome the resistance effected by the interference between the front ridge 20 and the undulation 24. The resistance effected by the interference between the rear ridge 16 and the rear lip 18 may also need overcome. Once the hopper cover 10 has been unlocked from the hopper 3, the user may slide the hopper cover 10 forwards until the side rails 14a, 14b disengage from the side ridges 12a, 12b.

As best seen in FIGS. 2C and 2D, the top panel 11 of the hopper cover 10 may be formed with a summit 11a disposed vertically higher than the side rails 14a, 14b, the front stop 22, and the rear lip 18 to form an overfilling volume that allows overfilling of the hopper 3 above the side ridges 12a, 12b, 16, 20 of the hopper 3 even when the top panel 11 fully covers the top opening O. The top panel 11 may also have formed thereon ridges 11b that promote rigidity of the top panel 11.

Figure 3A:
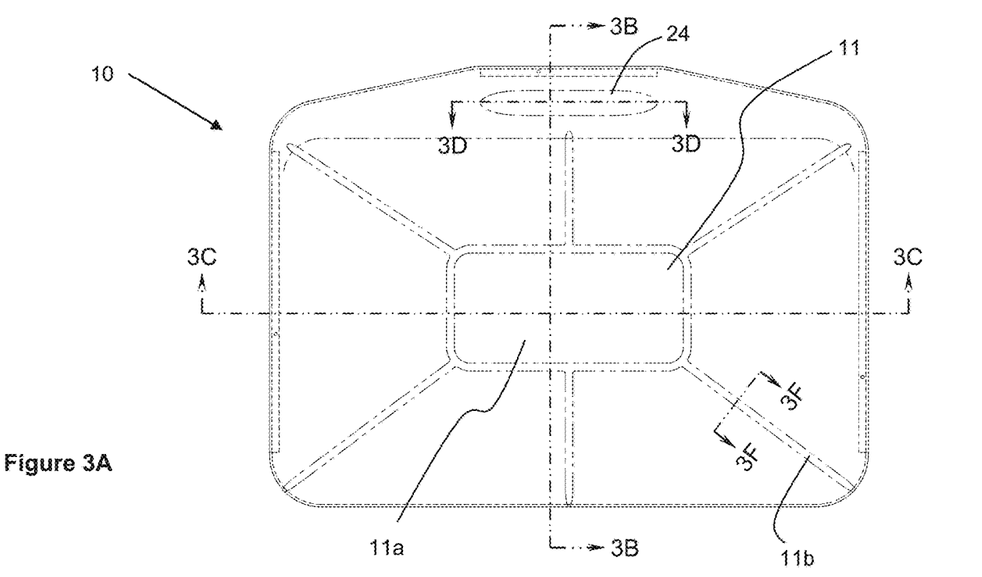
FIG. 3A illustrates a top view of an exemplary hopper cover.
Figure 3B:
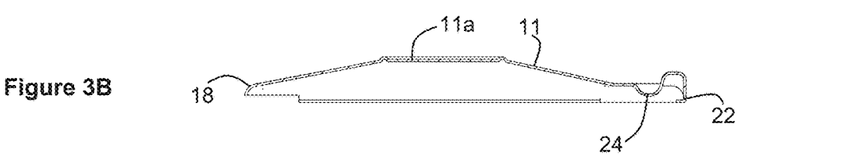
FIG. 3B illustrates a side to side cross-sectional view of the exemplary hopper cover of FIG. 3A.
Figure 3C:
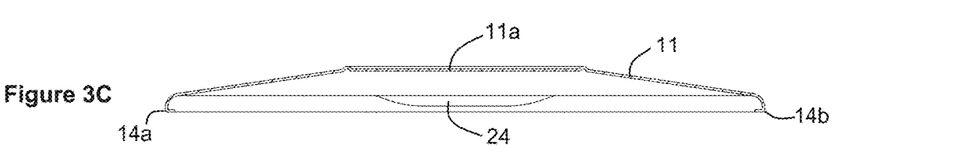
FIG. 3C illustrates a front to back cross-sectional view of the exemplary hopper cover of FIG. 3A.

FIGS. 3A-3F illustrate an exemplary hopper cover 10. FIG. 3A illustrates a top view of the exemplary hopper cover 10. As described above, the hopper cover 10 may include the top panel 11. FIGS. 3B and 3C illustrate cross-sectional views of the exemplary hopper cover 10. The hopper cover 10 may include the side rails 14a, 14b, the rear lip 18, the front stop 22, and the undulation 24. As best shown in FIGS. 3B and 3C, the side rails 14a, 14b, the rear lip 18, and the front stop 22 may all have generally downwardly sloping and overhanging configurations to effectively cover the hopper, keeping away water and debris and preventing spillage of the hopper's contents.

Figure 3D:
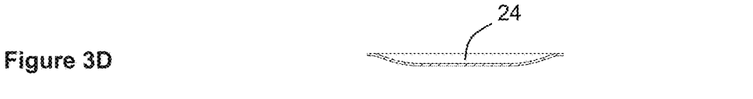
FIG. 3D illustrates a cross-sectional view of a handle of the exemplary hopper cover of FIG. 3A.

FIGS. 3A shows a top view of the undulation 24, FIG. 3B shows a side cross-section of the undulation 24, FIG. 3C shows a rear view of the undulation 24, and FIG. 3D illustrates a cross-sectional view of the undulation 24. The undulation 24 may be shaped as a handle or grab point so the user can use her hand to grab the hopper cover 10 when sliding it rearwards or forwards on the hopper 3.

The top panel 11, 14a, 14b, the rear lip 18, the front stop 22, and the undulation 24 may be integrally formed (e.g., molded) as a unitary hopper cover 10 of a plastic material. The hopper cover 10 may be fabricated from polyethylene terephthalate (PET), high-density polyethylene (HDPE), polyvinyl chloride (PVC), low-density polyethylene (LDPE), polypropylene (PP), polystyrene (PS), polycarbonate (PC), polymethyl methacrylate (PMMA), amorphous copolyester (PETG), or any other similar material. In one embodiment, the hopper cover 10 including the top panel 11 is transparent or translucent so that a user may see into the hopper and its contents even when the hopper cover 10 is installed.

Figure 3E:
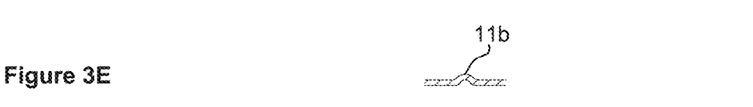
FIG. 3E illustrates a cross-sectional view of a stiffening ridge of the exemplary hopper cover of FIG. 3A.

The top panel 11 may be formed with a summit 11a disposed vertically higher than the side rails 14a, 14b, the front stop 22, and the rear lip 18 to form an overfilling volume that allows overfilling of the hopper. As shown in the cross-sectional view of FIG. 3F, the top panel 11 may also have formed thereon ridges 11b that promote rigidity of the top panel 11.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A hopper cover for a hopper, comprising:
   a top panel configured to cover a top opening of the hopper;
   side rails disposed on sides of the hopper cover attached to, or integral with, the top panel and together with the top panel forming side channels configured to engage side ridges of the hopper for the hopper cover to slide rearward with the top panel over the top opening;
   a front stop disposed on a front center of the hopper cover attached to, or integral with, the top panel and configured to engage a front ridge of the hopper to stop the hopper cover from further sliding rearward when the top panel fully covers the top opening;
   a rear lip disposed on a rear of the hopper cover attached to, or integral with, the top panel and having a downward slope configured to, when the hopper cover is fully engaged to the hopper, at least partially cover a rear ridge of the hopper; and
   an undulation formed on the hopper cover protruding vertically lower than the top panel, the undulation disposed on the hopper cover adjacent the front stop to, together with the front stop form a detent that, when the hopper cover is fully engaged to the hopper, traps the front ridge of the hopper between the front stop and the undulation to resist frontward slide of the hopper cover, effectively locking the hopper cover to the hopper.

2. The hopper cover of claim 1, wherein the undulation is formed as a grab point for a user's hand to slide the hopper cover rearwards or frontwards with the side channels engaged to the side ridges.

3. The hopper cover of claim 1, wherein the undulation has front and rear curved surfaces, the rear curved surface promotes flexing of the hopper cover when the rear curved surface engages the front ridge of the hopper as the hopper cover slides rearward with the side channels engaged to the side ridges to allow the detent to engage the front ridge of the hopper and the front curved surface promotes flexing of the hopper cover when the front curved surface engages the front ridge of the hopper as the hopper cover is urged frontward for the detent to disengage the front ridge of the hopper.

4. The hopper cover of claim 1, the top panel having ridges formed thereon to promote rigidity of the top panel.

5. The hopper cover of claim 1, wherein at least the top panel is translucent to allow a user visibility into the contents of the hopper even when the top panel fully covers the top opening.

6. The hopper cover of claim 1, wherein the top panel, the side rails, the front stop, the rear lip, and the undulation are integrally formed as a unitary hopper cover.

7. The hopper cover of claim 1, the top panel formed with a summit disposed vertically higher than the side rails, the front stop, and the rear lip to, when the top panel fully covers the top opening, form an overfilling volume that allows overfilling of the hopper above the side ridges of the hopper.

8. A hopper and hopper cover system, comprising:
   a hopper configured for holding a supply of spreadable material and having formed thereon an opening through which the spreadable material is fed into the hopper and front, rear, and side ridges;
   a hopper cover including: a top panel that is substantially rigid and is configured to cover the top opening,
   side rails disposed on sides of the hopper cover attached to, or integral with, the top panel and together with the top panel forming side channels configured to engage the side ridges of the hopper for the hopper cover to slide rearward with the top panel over the top opening;
   a front stop disposed on a front center of the hopper cover attached to, or integral with, the top panel and configured to engage the front ridge of the hopper to stop the hopper cover from further sliding rearward when the top panel fully covers the top opening; and
   an undulation formed on the hopper cover protruding vertically lower than the top panel, the undulation disposed on the hopper cover adjacent the front stop to, together with the front stop form a detent that, when the hopper cover is fully engaged to the hopper, traps the front ridge of the hopper between the front stop and the undulation to resist frontward slide of the hopper cover, effectively locking the hopper cover to the hopper.

9. The hopper and hopper cover system of claim 8, wherein the hopper cover includes:
   a rear lip disposed on a rear of the hopper cover attached to, or integral with, the top panel and having a downward slope to, when the hopper cover is fully engaged to the hopper, at least partially cover the rear ridge of the hopper, the rear lip disposed vertically higher than the front stop to permit rearward sliding of the hopper cover with the side channels engaged to the side ridges.

10. The hopper and hopper cover system of claim 8, wherein the undulation is formed as a grab point for a user's hand to slide the hopper cover rearwards or frontwards with the side channels engaged to the side ridges.

11. The hopper and hopper cover system of claim 8, wherein the undulation has front and rear curved surfaces, the rear curved surface promotes flexing of the hopper cover when the rear curved surface engages the front ridge of the hopper as the hopper cover slides rearward with the side channels engaged to the side ridges to allow the detent to engage the front ridge of the hopper and the front curved surface promotes flexing of the hopper cover when the front curved surface engages the front ridge of the hopper as the hopper cover is urged frontward for the detent to disengage the front ridge of the hopper.

12. The hopper and hopper cover system of claim 8, wherein at least the top panel is translucent to allow a user visibility into the contents of the hopper even when the top panel fully covers the top opening.

13. The hopper and hopper cover system of claim 8, the top panel formed with a summit disposed vertically higher than the side rails, the front stop, and the rear lip to, when the top panel fully covers the top opening, form an overfilling volume that allows overfilling of the hopper above the side ridges of the hopper.

14. A hopper lid for a hopper having a top opening, the hopper lid comprising:
   a top panel:
   side channels formed on sides of the hopper lid and configured to engage side ridges of the hopper for the hopper lid to slide over the top opening;
   a front stop formed on a front center of the hopper lid and configured to engage a front ridge of the hopper to stop the hopper lid from further sliding rearward when the top panel fully covers the top opening; and an undulation formed on the hopper lid protruding vertically lower than the top panel and adjacent the front stop to, together with the front stop form a detent that, when the top panel fully covers the top opening, traps the front ridge of the hopper between the front stop and the undulation to resist slide of the hopper lid, effectively locking the hopper lid to the hopper.

15. The hopper lid of claim 14, comprising:
   a rear lip formed on a rear of the hopper lid and configured to, when the top panel fully covers the top opening, at least partially cover a rear ridge of the hopper.

16. The hopper lid of claim 15, wherein the rear lip is disposed vertically higher than the front stop to permit rearward sliding of the hopper lid with the side channels engaged to the side ridges.

17. The hopper lid of claim 14, wherein the undulation is formed as a grab point for a user's hand to urge sliding of the hopper lid rearwards or frontwards with the side channels engaged to the side ridges.

18. The hopper lid of claim 14, wherein the undulation has front and rear curved surfaces, the rear curved surface configured to promote flexing of the hopper lid when the rear curved surface engages the front ridge of the hopper as the hopper lid slides rearward with the side channels engaged to the side ridges to allow the detent to engage the front ridge of the hopper and the front curved surface configured to promote flexing of the hopper lid when the front curved surface engages the front ridge of the hopper as the hopper lid is urged frontward for the detent to disengage the front ridge of the hopper.

19. The hopper lid of claim 14, wherein at least the top panel is translucent to allow a user visibility into the contents of the hopper even when the top panel fully covers the top opening and wherein the top panel, the side rails, the front stop, the rear lip, and the undulation are integrally formed as a unitary hopper lid of a plastic material.

20. The hopper lid of claim 14, the top panel formed with a summit disposed vertically higher than the side channels to, when the top panel fully covers the top opening, form an overfilling volume that allows overfilling of the hopper above the side ridges of the hopper.

\* \* \* \* \*